Sept. 29, 1931.    T. WILFRED    1,825,497
LIGHT PROJECTION DISPLAY APPARATUS
Filed June 1, 1929    2 Sheets-Sheet 1
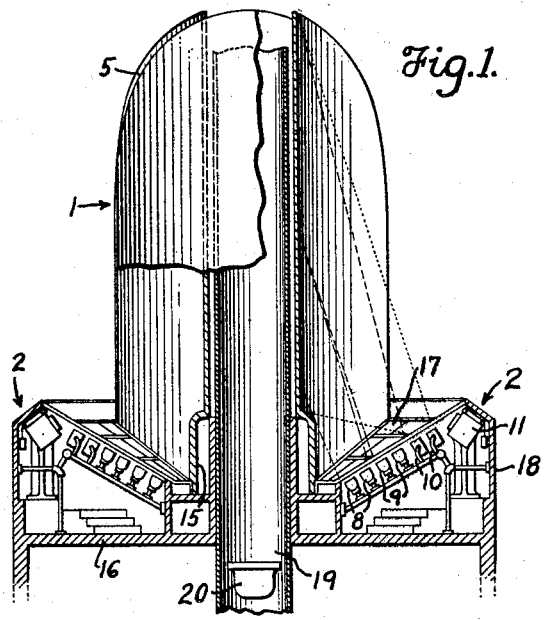
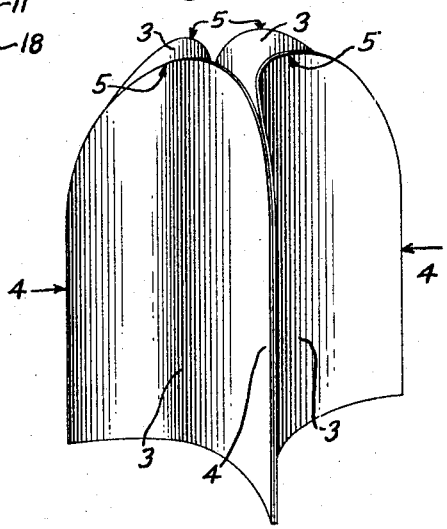
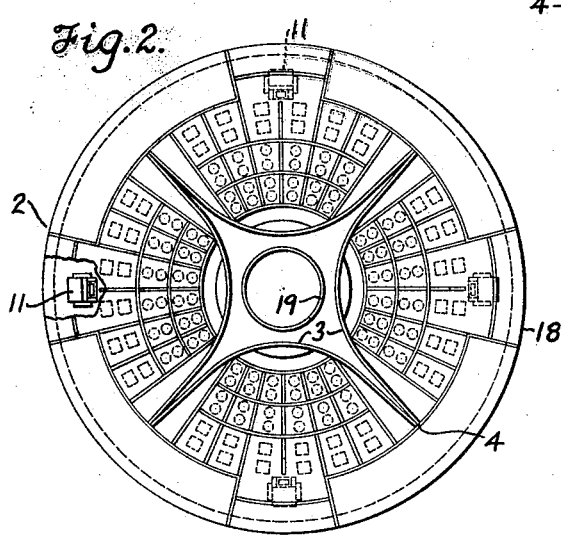
INVENTOR:
Thomas Wilfred
BY
Morrison, Kennedy & Campbell,
ATTORNEYS.

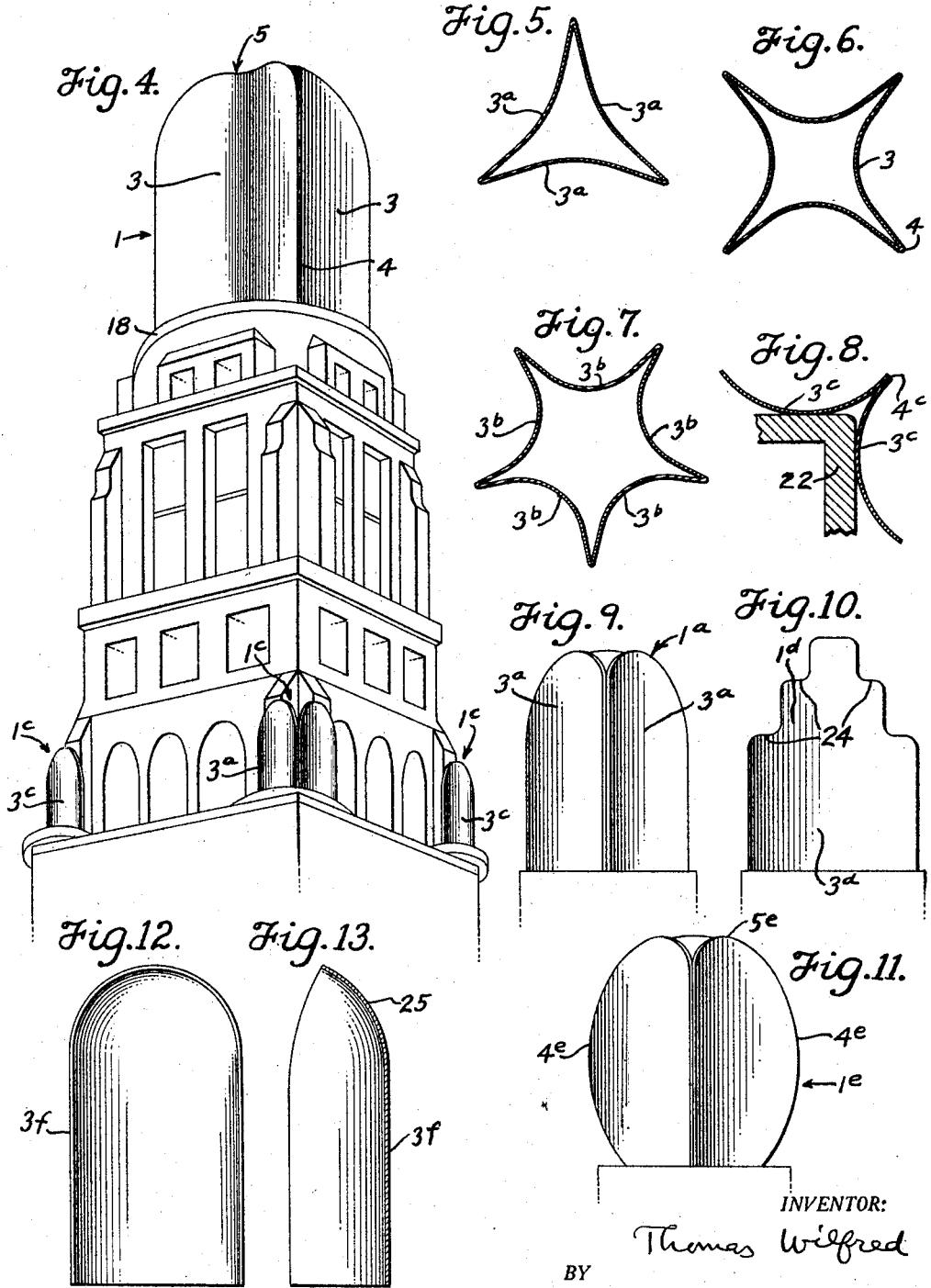

Patented Sept. 29, 1931

1,825,497

UNITED STATES PATENT OFFICE

THOMAS WILFRED, OF FOREST HILLS, NEW YORK

LIGHT PROJECTION DISPLAY APPARATUS

Application filed June 1, 1929. Serial No. 367,803.

This invention relates to light projection display apparatus, and refers particularly to such apparatus for use out of doors to give attractive and pleasing optical effects with light.

In accordance with the modern trend in architecture, office buildings and the like are being provided with ornamental domes, spires, buttresses, and other forms which can be illuminated at night, either for advertising purposes or for the gratification of the public's esthetic senses. Such domes and the like are necessarily massive, heavy, and costly to a degree which is hardly warranted by the results obtained.

An important object of the present invention is to provide a novel apparatus which can be used in place of the above enumerated architectural constructions.

Another object is to provide such an apparatus in which the optical effects can be extensively varied.

A further object is to provide such an apparatus which will be extremely simple in construction, lending itself to economy in production, and which will be strong and durable in service.

Other and further objects and advantages of the present invention will be clear from the hereinafter following description in connection with the accompanying drawings.

To the attainment of the objects and advantages referred to, the present invention consists in the novel features of construction, combination, and arrangement of parts hereinafter set forth and particularly pointed out in the appended claims.

In the drawings accompanying this specification, Figure 1 is a view, partly in elevation and partly in vertical section, of one form of light projection display apparatus embodying the invention;

Fig. 2 is a top plan view thereof;

Fig. 3 is a detail perspective view of the polysided screen of Figs. 1 and 2;

Fig. 4 is a fragmentary perspective view of a building with the invention applied to it;

Figs. 5, 6 and 7 are diagrammatic plan views of modifications of the polysided screen, respectively showing the arrangement of three, four, and five concave sides disposed so that the units are viewable from any direction;

Fig. 8 is a similar view showing the use of only two screens on a corner of a rectangular structure;

Fig. 9 is an elevation showing one form for the upper edges of the polysided screen;

Fig. 10 is a similar view showing another modified form wherein the upper edge of each face of the screen has several set-backs or steps;

Fig. 11 is another modification of the screen structure wherein the meeting edges of the adjacent screen faces are curved;

Fig. 12 is a face view of one of the screen sides in which the upper portion of the screen is concave horizontally as well as vertically; and Fig. 13 is a vertical transverse sectional view on line 13—13 of Fig. 12.

Referring particularly to Figs. 1, 2 and 3, it will be seen that the invention comprises a polysided screen 1 adapted to be illuminated by light projecting means 2 at the base thereof. The polysided screen 1 is composed of a plurality of differently facing concave sides or walls 3, the adjacent ones of which are substantially tangent to each other whereby they come together in relatively thin longitudinal or vertical edges 4. The upper edges 5 of the several concave sides 3 may be rounded off to a convex curvature, so that the complete screen, when viewed from any angle, will simulate a dome in appearance. By virtue of the fact that said edges 4 are thin as above described, it will be possible to view portions of two of the concave sides at once, without seeing any perceptible line of division between them.

The light projecting means 2 are arranged in banks at the bases of the several concave surfaces of the polysided screen 1, as best shown in Figs. 1 and 2. Each of such banks includes a plurality of flood lights 8 and 9, and spot lights 10, arranged in concentric arcuate series. The flood lights 8 may be of one certain color, for example green, and may be adapted to project colored light on the lower half of the corresponding screen face 3, whereas the flood lights 9 may be of a different color, such as red, and adapted to project their light on the upper half of the screen. The spot lights 10, on the other hand, are adapted to throw a white light on the entire surface of the screen, or upon selected portions of it, and may be employed either independently of or in conjunction with the flood lights. If desired the flood lights may include the three primary colors, red, green and blue projectable at will in various arrangements and intensities to produce any desired color and tone.

In addition to the flood lights and the spot lights, each bank includes a projecting unit 11, which, by a system of moving lamps, lenses, and color screens, will throw on the screen a constantly moving display of colors in a wide variety of combinations, forms, and motions. Such a display is of the kind that has become popularly known as "light music" and may be produced with the aid of an apparatus such as is disclosed, for example, in U. S. Letters Patent No. 1,549,778, issued to R. Lovstrom on August 18, 1925. Since the details of construction of the above mentioned projecting units do not constitute any part of the present invention, they have been shown in the drawings only diagrammatically.

In one of its practical embodiments, the invention is mounted on top of a building, either for the enhancement of the building or for advertising purposes. Thus the polysided screen 1 is disposed upon or suitably secured to a central pedestal 15 on the roof 16 of the building. The several banks of light projecting means 2 are radially inclined about said pedestal 15, and over the surrounding portion of the roof 16, and are preferably protected from the elements by a sectional glass skylight 17, which extends from said pedestal outwardly and upwardly to an encircling wall 18.

A tube 19 has been shown in Fig. 1 rising vertically in and through the center of the polysided screen 1 and may have mounted within it a powerful searchlight 20. This searchlight 20 is adapted to throw a shaft of light upward into the air a considerable distance above the screen. As a further embodiment of this idea, the tube 19 may represent the smokestack of the building, in which case the searchlight 20 may be disposed within it or omitted, as desired. Furthermore, the polysided screen 1 may be built around a water tank or other structure.

In use, the several concave sides 3 of the polysided screen 1 will be simultaneously illuminated at night by their respective light projecting means 2. Various effects can be produced by combining the flood lights 8 and 9 with the spot lights 10, and these lights may be lighted continuously or, if desired, intermittently under the control of suitable automatic switches. Still more pleasing and constantly varying optical effects can be produced by means of the projecting units 11 under the manual control of an artist who is skilled in the use of such apparatus. Preferably the various banks of light projecting means will be synchronized so that all of the surfaces 3 will be similarly illuminated at all times. The concavity of the faces 3, coupled with the arcuate arrangement of the lights, makes possible a substantially uniform distribution of light over the entire visible area of the screen. This uniformity of illumination, together with the fact that the adjacent surfaces 3 meet in thin edges 4, contributes to the dome-like effect produced, and eliminates any perceptible break between two such surfaces when portions of them are viewed together.

The number of concave sides 3 which constitute the polysided screen 1 may be varied as desired for different installations. Thus in Figs. 2 and 4 there are four such concave sides employed, each facing in a different direction. In Fig. 5, on the other hand, three concave sides $3^a$ are equilaterally disposed, while in Fig. 7 there are five concave sides $3^b$ in a pentagonal arrangement. In each of these forms, the light projecting means 2 will be similar to those described with reference to Figs. 1 and 2, but of course, the number of banks of such means will correspond with the number of concave surfaces on the screen.

The invention may be further modified in that the screen need not necessarily be viewable from every direction. One such modification is shown in Fig. 8, wherein only two concave sides $3^c$ are employed, they being mounted on a rectangular corner wall 22 of a building or other structure. These two surfaces $3^c$ meet in a relatively thin edge $4^c$, and are adapted to be illuminated in the same manner as the surfaces 3 of the first-described form.

One application of the modification shown in Fig. 8 is illustrated in the lower portion of Fig. 4. Here a building is shown as equipped with a polysided screen 1 on its roof. At a suitable distance below the roof, the corners of the building are provided with two-faced screens $1^c$, each of the faces $3^c$ of which is smaller than those of the screen 1. With this arrangement, there may be had a gradation of light upward toward the roof of the building.

The several faces 3 of the polysided screen 1 of Figs. 1, 3 and 4 have been described as being rounded off at 5. This same general form is shown in Fig. 9 in a three-sided screen $1^a$. But in this respect also, the invention may be varied in several ways to harmonize with different styles of architecture. For example, in Fig. 10 a screen $1^d$ is shown wherein the upper edges of the concave faces $3^d$ are formed with a plurality of set-backs or steps 24.

In Fig. 11, the longitudinal, thin edges $4^e$ of a screen $1^e$ are formed to a graceful convex curvature which merge with the curved upper edges $5^e$. By varying the proportions, different effects may be produced, and the screen $1^e$ may even simulate a sphere in appearance.

Another modification of the invention is shown in Figs. 12 and 13. Here the upper portion of the screen face $3^f$ is concaved longitudinally as well as transversely, giving more of a dished effect, as indicated by the reference character 25.

From the foregoing it will be evident that a novel light projecting display apparatus has been provided, which will be of simple construction and pleasing appearance. While it has been described and illustrated as for architectural display, the invention is adapted for other practical purposes. For example, it may be used as an aviation beacon for the guidance of aviators on transcontinental airways. For this purpose it will be very efficient because of its visibility at great distances.

The invention is susceptible of further and other modifications in the details of construction and arrangement of parts, and the right is herein reserved to make such changes as fall within the scope of the appended claims without departing from the spirit of the invention.

What is claimed is:

1. Light projection display apparatus comprising an upright polysided screen consisting of a plurality of upright differently facing concave sides, meeting in thin edges, and a light-projecting means spaced outwardly in front of each of said concave sides, the several projecting means adapted to project cooperatively upon the respective adjacent concave sides to afford combined effects.

2. Apparatus as in claim 1 and wherein the projecting means contain means to cause progressively movable or variable effects upon the respective sides.

3. Apparatus as in claim 1 and wherein the several concave sides extend completely around the screen affording effects viewable from all sides.

In testimony whereof, this specification has been duly signed by

THOMAS WILFRED.